(12) United States Patent
Hawener et al.

(10) Patent No.: US 6,415,884 B1
(45) Date of Patent: Jul. 9, 2002

(54) SUSPENSION SYSTEM FOR A DRIVE ASSEMBLY OF A MOTOR VEHICLE

(75) Inventors: Rainer Hawener, Tiefenbronn; Peter Negowski, Stuttgart, both of (DE)

(73) Assignee: Dr. Ing. h.c.F. Porsche AG, Weissach (DE)

(*) Notice: Subject to any disclaimer, the term of this patent is extended or adjusted under 35 U.S.C. 154(b) by 0 days.

(21) Appl. No.: 09/563,532

(22) Filed: May 3, 2000

(30) Foreign Application Priority Data

May 3, 1999 (DE) .......................................... 199 20 052

(51) Int. Cl.[7] .................................................. B60K 1/00
(52) U.S. Cl. ....................... 180/291; 180/292; 180/311; 180/312; 180/377; 280/781
(58) Field of Search ................................. 180/291, 292, 180/311, 312, 377; 280/781

(56) References Cited

U.S. PATENT DOCUMENTS

| | | | | |
|---|---|---|---|---|
| 3,913,696 A | * | 10/1975 | Kennedy et al. | 180/291 X |
| 4,046,415 A | * | 9/1977 | Klees et al. | 180/291 X |
| 4,369,559 A | * | 1/1983 | Phillips | 180/291 |
| 4,805,720 A | * | 2/1989 | Clenet | 180/291 |
| 5,035,296 A | * | 7/1991 | Sjostrand | 180/292 X |
| 5,078,230 A | * | 1/1992 | Hasuike | 180/291 |
| 5,267,623 A | * | 12/1993 | Kashiwagi | 180/377 |
| 5,273,130 A | * | 12/1993 | Nemeth | 180/292 |
| 5,704,643 A | * | 1/1998 | Ymanaka et al. | 180/291 X |
| 5,758,738 A | * | 6/1998 | Carroll et al. | 180/292 |
| 5,915,495 A | * | 6/1999 | Kerlin et al. | 180/291 |
| 5,975,624 A | * | 11/1999 | Rasidescu et al. | 180/312 X |
| 6,099,039 A | * | 8/2000 | Hine | 280/781 |

* cited by examiner

Primary Examiner—Lanna Mai
Assistant Examiner—Toan C To
(74) Attorney, Agent, or Firm—Crowell & Moring LLP

(57) ABSTRACT

A drive assembly of a motor vehicle is secured above a subframe to a separate cross member by way of two engine mounts, with a third mount being provided on a transmission housing or on a distributor drive. The cross member is secured separately and rigidly to the subframe at the vehicle body. The subframe is fastened movably transversely and lengthwise by an elastic mount on the vehicle body. The engine mounts are preferably located immediately adjacent to the engine housing at approximately equal distances from the lengthwise central axis of the assembly. The elastic transmission mount is arranged in a vertical lengthwise plane that runs through a lengthwise central axis. Moreover, all three mounts are located in a diagonally forward rising diagonal plane relative

19 Claims, 5 Drawing Sheets

SUSPENSION SYSTEM FOR A DRIVE ASSEMBLY OF A MOTOR VEHICLE

BACKGROUND AND SUMMARY OF THE INVENTION

This application claims the priority of German Patent Application 199 20 052.1, filed May 3, 1999, the disclosure of which is expressly incorporated by reference herein.

The invention relates to a suspension for a front drive assembly of a motor vehicle, with the drive unit being aligned in the lengthwise direction of the vehicle and supported by elastic mounts on the vehicle body.

A four-point suspension for a drive assembly of a motor vehicle on a subframe is known from U.S. Pat. No. 5,074,374, with the subframe being fastened to the vehicle body by an elastic mount. Another mount is provided on the transmission housing.

A goal of the invention is to create a suspension for a drive unit of a motor vehicle for an off-road vehicle that is secured to the vehicle body in a functionally separate and independent fashion by a corresponding subframe in a manner that is as free as possible of vibration and can be fastened with the subframe as a modular unit to the vehicle body and also provides additional stiffening of the front end of the vehicle.

This goal is achieved, according to the invention, by a suspension of the above-noted type, comprising a pair of vehicle side frame members spaced laterally from one another, a subframe which in use supports wheel suspension assemblies, said subframe being supported at undersides of the respective side frame members, an engine support cross member which is separate from the subframe and connected with the side frame members, said engine support cross member having two elastic engine mounts operable to support the engine housing above the subframe, and a transmission support cross member connected with the side members and having an elastic transmission mount operable to support the transmission housing, wherein the subframe is connected with the side frame members by elastic mounts operable to permit transverse and longitudinal movement of the subframe with respect to the side members.

The drive assembly is supported above a subframe on a separate engine cross member by two elastic mounts with receptacles or the like on the engine housing. A third mount is provided on the transmission housing or on the distributor transmission housing and is supported on a transmission cross member connected with side members.

The fastening mount of the subframe, located forward relative to the direction of travel of the vehicle, is attached together with the engine cross member to side members of the vehicle. In particular, this engine cross member is connected rigidly at its free ends with the side members of the vehicle body subframe is held by separate elastic mounts, with interposition of the cross member, to the side members of the vehicle body and has a certain degree of elastic mobility.

To attach the subframe and the engine cross member, a continuous mounting bolt is used which passes through a first spacing bushing in the elastic mount of the subframe, passes through a second spacing bushing in the engine cross member, and is secured in a threaded bushing of the side member.

An offset mount bracket is mounted to receive the engine mounts at the free ends of the engine cross member, said bracket also having a fastening provision for the engine cross member on the side members. In addition to the direct fastening of this cross member by its free ends to the side members, an additional mounting provision is provided at a lengthwise distance from the first mount.

The engine cross member is made offset between the side members with this offset being located approximately in a horizontal plane with the cross members of the subframe so that the engine housing is located lower down and its position is not interfered with.

Since the subframe and the engine cross member are fastened separate from one another to the side members relative to the elastic mount of the subframe, a functional separation can be created between the subframe suspension and the engine suspension, so there can be no influence of the various assemblies and excitations on the subframe. In addition, a subframe can be used for different engines with the cross member being adaptable to the various engines with regard to the engine mounts. In addition, the front end of the vehicle is made stiffer by the engine cross members as a result of the rigid connection to the side members. The essential inventive advantage is therefore that an optimum amount of play for mounting the engine mounts can be produced with the cross member being replaceable by another cross member with a corresponding arrangement of the engine mounts.

The engine mounts, according to certain preferred embodiments of the invention, are located immediately adjacent to the engine housing at an approximately equal distance from the lengthwise central axis of the assembly. A transmission mount is located in a vertical plane that runs approximately through the lengthwise central axis. The three mounts are located on a common plane that rises diagonally forward, with this plane being located below a horizontal center of gravity plane. The engine mounts are located in the vicinity of a vertical center of gravity plane, with the transmission mount being located at a considerable distance from the vertical center of gravity plane. The transmission mount is located at a greater distance from the vertical center of gravity plane than the two engine mounts.

The arrangement of the engine mounts and the transmission mounts is chosen essentially so that no significant vibration can spread from the drive assembly to the body.

Other objects, advantages and novel features of the present invention will become apparent from the following detailed description of the invention when considered in conjunction with the accompanying drawings.

DETAILED DESCRIPTION OF THE DRAWINGS

Figure 1:
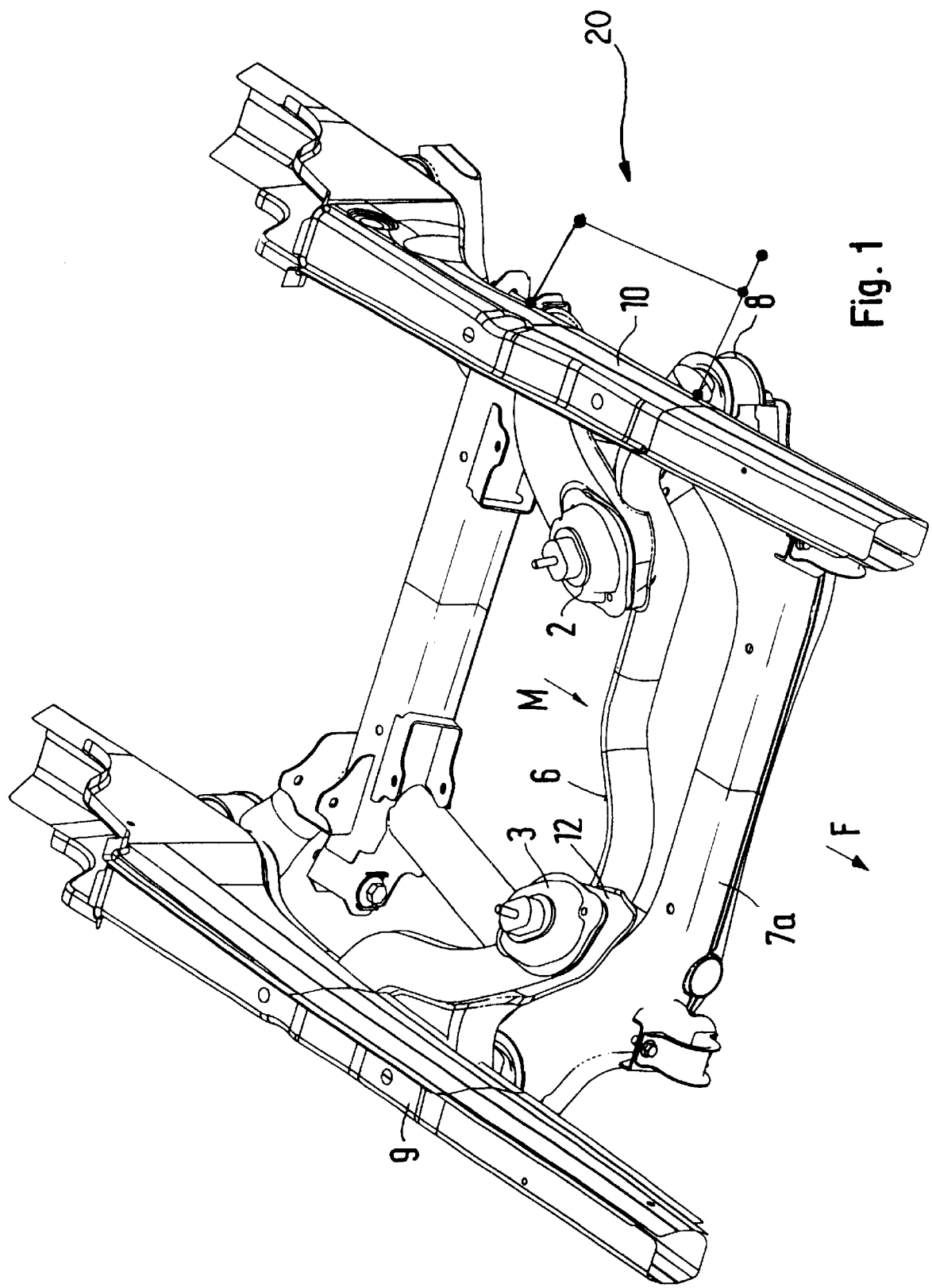
FIG. 1 is a schematic partial view of a suspension for a front-drive motor vehicle.
Figure 2:
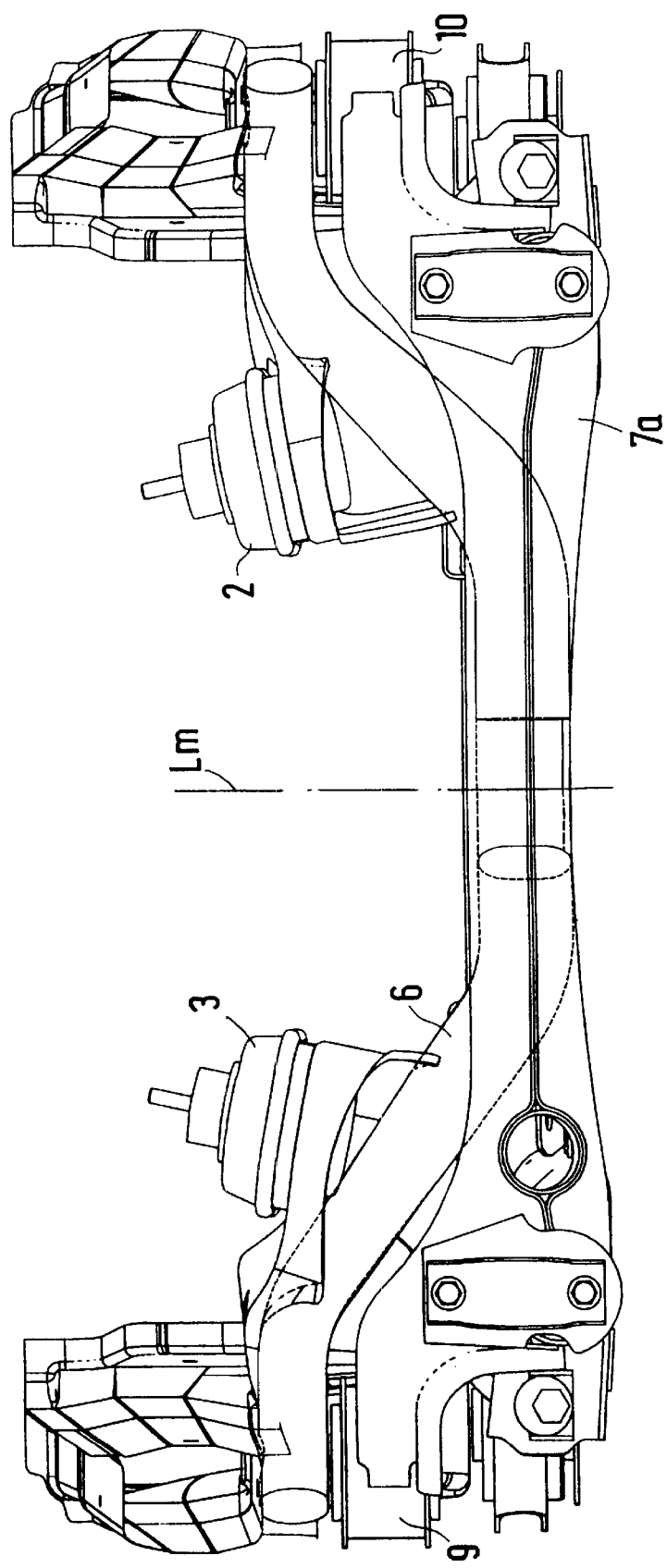
FIG. 2 is a front view of a drive assembly suspension with engine mounts according to FIG. 1.
Figure 3:
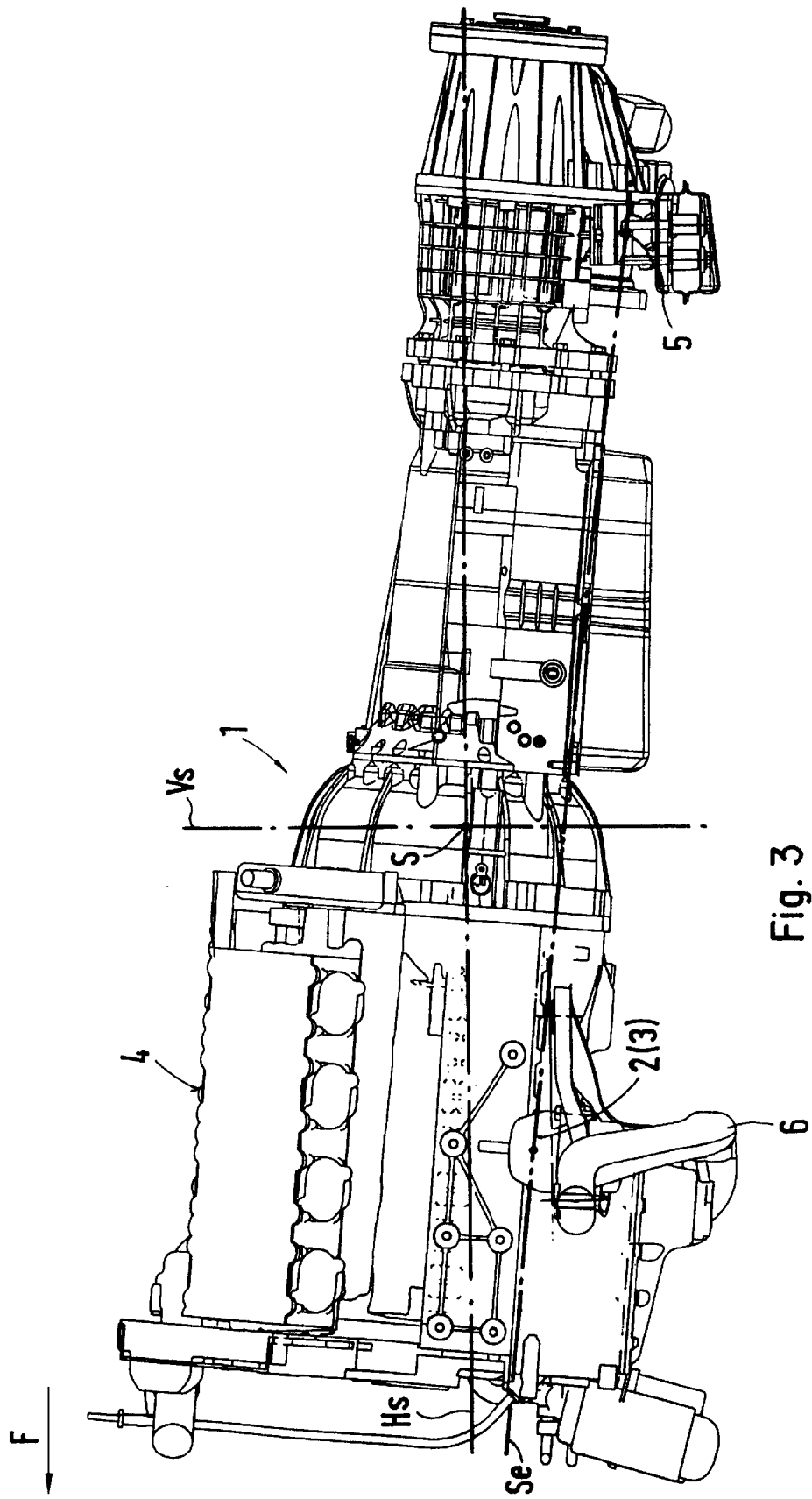
FIG. 3 is a side view of a drive assembly attached to the engine mounts of FIGS. 1 and 2 and to a transmission mount.
Figure 4:
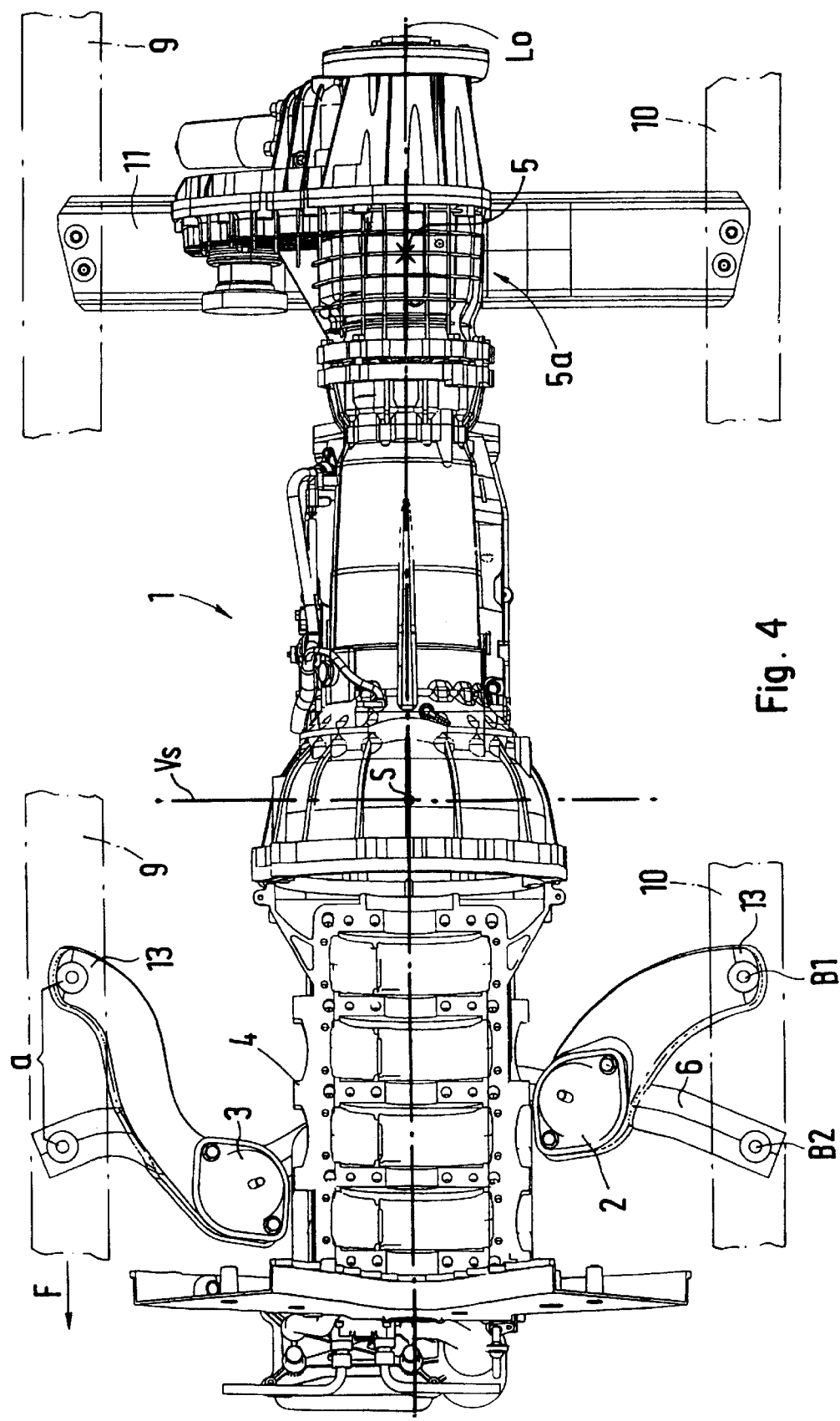
FIG. 4 is a top view of the drive assembly with cross members and mount brackets for the engine mounts.
Figure 5:
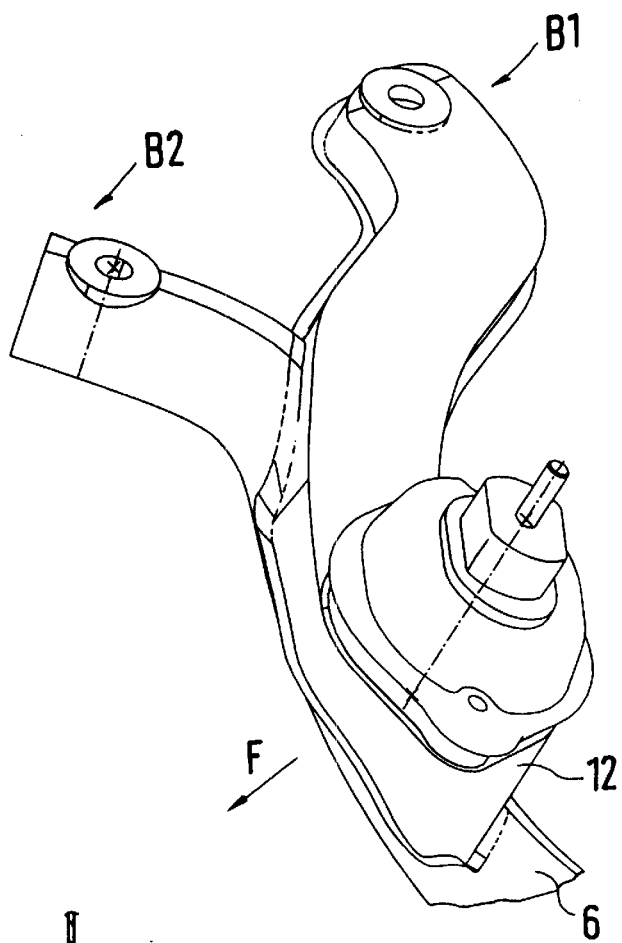
FIG. 5 is an enlarged view of the mount brackets on the engine cross member with engine mounts and fastening.
Figure 6:
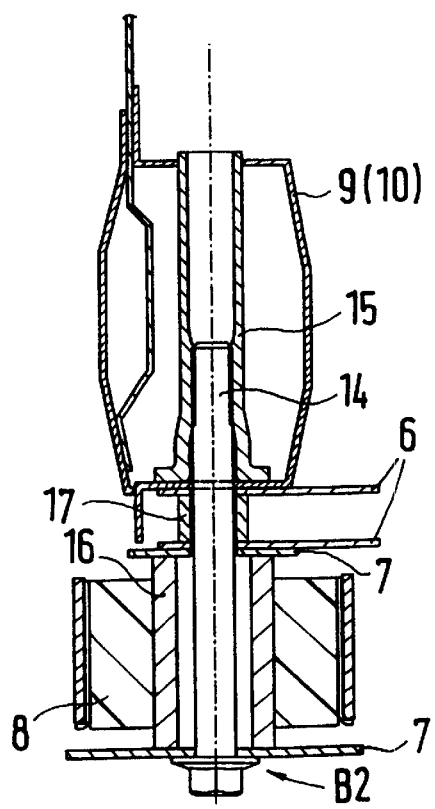
FIG. 6 is a cross section through the fastening mechanism for the connection of the subframe, the engine cross member and the side members of FIG. 1.

A drive assembly 1 for a motor vehicle is located in a front end of a vehicle and supported on engine housing 4 by at least two engine mounts 2, 3 and by at least one transmission mount 5 on the transmission housing or on the distributor-transmission housing 5a relative to the vehicle body.

Engine mounts 2, 3 of drive assembly 1 are held on an engine cross member 6 that extends partially above a subframe 7 to which a wheel suspension is pivotably articulated and which is connected by four elastic mounts 8 with the vehicle body at side members 9, 10, and transmission mount 5 is provided beneath transmission housing 5a and abuts a transmission cross member 11 connected endwise with side members 9, 10.

The front engine cross member 6 is provided endwise with a mount bracket 12 which receives an engine mount 2, 3 on the top and which extends rearward relative to travel direction F, and the free end 13 is connected with a side member 9, 10. This fastening B1 is at a lengthwise distance a relative to front fastening B2 so that a sufficient support base exists.

Attachment B2 of subframe 7 together with engine cross member 6 is effected by a pushed-through mounting bolt 14 which is secured in a threaded sleeve 15 of side member 9, 10. In order for engine cross member 6 to remain unaffected by elastic mount 8 of subframe 7, mount 8 has an internal first spacing sleeve 16 and cross member 6 has a second spacing sleeve 17, so that it can be separated from elastic mount 8 and the engine cross member 6 is connected rigidly with side members 9, 10 by an inserted threaded bushing.

Engine cross member 6 is offset in the central area M in such fashion that engine housing 4 can be located low and thus extends partially between side members 9, 10 and the vehicle body. Engine mounts 2, 3 are located immediately adjacent to engine housing 4 and at an approximately equal distance from the lengthwise central axis Lo of the assembly. The elastic transmission mount 5 lies in a lengthwise plane that runs approximately perpendicularly through lengthwise central axis Lo.

In particular, engine mounts 2, 3 and the transmission mount are located below a horizontal center of gravity plane Hs and the engine mount is located in the vicinity of a vertical center of gravity plane Vs and approximately centrally with respect to engine housing 4, as viewed in the lengthwise direction. Transmission mount 5 is located at a greater distance from vertical center of gravity plane Vs than the two engine mounts 2, 3. In addition, all three mounts 2, 3, and 5 are located on a common diagonal plane Se which, relative to travel direction F, is located so that it rises toward the front. In particular, to achieve a vibration behavior that is as favorable as possible for drive assembly 1, engine mounts 2, 3 are located in the vehicle body close to horizontal center of gravity plane Hs and approximately centrally with respect to engine housing 4 relative to its lengthwise axis, adjusted diagonally with respect to one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the claims and equivalents thereof.

What is claimed is:

1. A suspension system for a vehicle drive assembly including an engine with an engine housing and a transmission with a transmission housing, comprising:

a pair of vehicle side frame members spaced laterally from one another, a subframe which in use supports wheel suspension assemblies, said subframe being supported at undersides of the respective side frame members, an engine support cross member which is separate from the subframe and connected with the side frame members, said engine support cross member having two elastic engine mounts operable to support the engine housing above the subframe, and a transmission support cross member connected with the side members and having an elastic transmission mount operable to support the transmission housing, wherein the subframe is connected with the side frame members by elastic subframe mounts operable to permit transverse and longitudinal movement of the subframe with respect to the side members.

2. The suspension system according to claim 1, wherein the two elastic engine mounts are located immediately adjacent to the engine housing at approximately same distances from a lengthwise central axis of the assembly, and wherein the elastic transmission mount is located in a vertical lengthwise plane that extends approximately through the lengthwise central axis and all three mounts lie in a diagonal plane that rises diagonally toward the front relative to a vehicle direction of travel.

3. The suspension system according to claim 2, wherein the engine mounts and the transmission mount are located below a horizontal center of gravity plane and the engine mounts are located in the vicinity of a vertical center of gravity plane and approximately centrally with respect to the engine housing as viewed in the lengthwise direction, and wherein the transmission mount is located at a greater distance with respect to the vertical center of gravity plane than the two engine mounts which together are mounted at an angle to the engine housing.

4. The suspension system according to claim 2, wherein the engine support cross member has at each of its two free ends an offset mount bracket on each of which one of the engine mounts is fastened and each of the mount brackets has a fastening which is located endwise to the side members and is located at a lengthwise distance from the other mount of the engine cross member as well as the subframe on the vehicle body.

5. The suspension system according to claim 2, wherein the engine cross member is located behind a subframe cross member relative to a direction of travel and has a continuous offset in a central area and this central area is located approximately in a common horizontal plane with a front subframe cross member.

6. The suspension system according to claim 1, wherein the engine mounts and the transmission mount are located below a horizontal center of gravity plane and the engine mounts are located in a vicinity of a vertical center of gravity plane and approximately centrally with respect to the engine housing as viewed in a lengthwise direction of the suspension system, and wherein the transmission mount is located at a greater distance with respect to the vertical center of gravity plane than the two engine mounts which together are mounted at an angle to the engine housing.

7. The suspension system according to claim 5, wherein the engine support cross member has at each of its two free ends an offset mount bracket on each of which one of the engine mounts is fastened and each of the mount brackets has a fastening which is located endwise to the side members and is located at a lengthwise distance from the other mount of the engine cross member as well as the subframe on the vehicle body.

8. The suspension system according to claim 6, wherein the engine cross member is located behind a subframe cross member relative to a direction of travel and has a continuous offset in a central area and this central area is located approximately in a common horizontal plane with a front subframe cross member.

9. The suspension system according to claim 1, wherein the engine support cross member has at each of its two free ends an offset mount bracket on each of which one of the engine mounts is fastened and each of the mount brackets has a fastening which is located endwise to the side members and is located at a lengthwise distance from the other mount of the engine cross member as well as the subframe on the vehicle body.

10. The suspension system according to claim 9, wherein the engine cross member is located behind a subframe cross member relative to a direction of travel and has a continuous offset in a central area and this central area is located approximately in a common horizontal plane with a front subframe cross member.

11. The suspension system according to claim 9, wherein the engine cross member is rigidly connected by a mounting bolt, that passes through the elastic subframe mount, with the side members of the vehicle body.

12. The suspension system according to claim 11, wherein the elastic subframe mount has a first spacing bushing, a second spacing bushing in the engine cross member, and a threaded bushing on the side member to secure the respective mounting bolt.

13. The suspension system according to claim 1, wherein the engine cross member is located behind a subframe cross member relative to a direction of travel and has a continuous offset in a central area and this central area is located approximately in a common horizontal plane with a front subframe cross member.

14. The suspension system according to claim 13, wherein the engine cross member is rigidly connected by a mounting bolt, that passes through the elastic subframe mount, with the side members of the vehicle body.

15. The suspension system according to claim 14, wherein the elastic subframe mount has a first spacing bushing, a second spacing bushing in the engine cross member, and a threaded bushing on the side member to secure the respective mounting bolt.

16. The suspension system according to claim 1, wherein the engine cross member is rigidly connected by a mounting bolt, that passes through the elastic subframe mount, with the side members of the vehicle body.

17. The suspension system according to claim 16, wherein the elastic subframe mount has a first spacing bushing, a second spacing bushing in the engine cross member, and a threaded bushing on the side member to secure the respective mounting bolt.

18. The suspension system according to claim 1, wherein the engine support cross member is rigidly clamped to the side members by respective clamping bolts.

19. The suspension system according to claim 18, wherein the subframe is connected by said bolts to an underside of the engine support cross member, said bolts extending from below through both a subframe bearing mount and the engine support cross member.

* * * * *